United States Patent
Hammer et al.

(10) Patent No.: US 8,652,426 B2
(45) Date of Patent: *Feb. 18, 2014

(54) USE OF AQUEOUS GUANIDINIUM FORMATE SOLUTIONS FOR THE SELECTIVE CATALYTIC REDUCTION OF NITROGEN OXIDES IN EXHAUST GASES OF VEHICLES

(75) Inventors: Benedikt Hammer, Tacherting (DE); Hans-Peter Krimmer, Kirchweidach (DE); Bernd Schulz, Waldkraiburg (DE); Eberhard Jacob, Krailling (DE)

(73) Assignee: AlzChem Trostberg GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/448,330

(22) PCT Filed: Dec. 20, 2007

(86) PCT No.: PCT/EP2007/011284
§ 371 (c)(1),
(2), (4) Date: Sep. 21, 2009

(87) PCT Pub. No.: WO2008/077587
PCT Pub. Date: Jul. 3, 2008

(65) Prior Publication Data
US 2011/0008228 A1 Jan. 13, 2011

(51) Int. Cl.
*B01D 11/00* (2006.01)
*B01D 53/56* (2006.01)
*C01C 1/02* (2006.01)

(52) U.S. Cl.
USPC ........... 423/32; 423/213.2; 423/237; 423/352

(58) Field of Classification Search
None
See application file for complete search history.

(56) References Cited

U.S. PATENT DOCUMENTS

| 5,628,186 | A | * | 5/1997 | Schmelz | .................... 60/274 |
| 5,691,099 | A | * | 11/1997 | Kusakata et al. | ............ 430/162 |
| 2002/0104312 | A1 | * | 8/2002 | Hoffman et al. | ................ 60/286 |
| 2005/0031514 | A1 | * | 2/2005 | Patchett et al. | ............ 423/239.2 |
| 2008/0286165 | A1 | * | 11/2008 | Graupner et al. | ............ 422/148 |

FOREIGN PATENT DOCUMENTS

| DE | 3815807 | * | 11/1989 |
| DE | 3815807 | A1 | 11/1989 |
| DE | 4221451 | * | 1/1994 |
| DE | 4221451 | A1 | 1/1994 |
| EP | 0342184 | A2 | 11/1989 |
| JP | 64-000045 A 11 | | 1/1989 |
| JP | 2007-501353 A 11 | | 1/2007 |
| WO | WO-87/02023 | A1 | 4/1987 |
| WO | 95/04211 | * | 2/1995 |
| WO | WO-95/04211 | A1 | 2/1995 |

OTHER PUBLICATIONS

Piazzesi, Gaia et al. "Isocyanic acid hydrolysis over Fe-ZSM5 in urea-SCR" Catalysis Communications 7, 600-603 (2006).*

* cited by examiner

*Primary Examiner* — Melvin C Mayes
*Assistant Examiner* — Sheng H Davis
(74) *Attorney, Agent, or Firm* — Fulbright & Jaworski LLP

(57) ABSTRACT

The invention relates to the use of aqueous guanidinium formiate solutions, optionally combined with urea and/or ammonia and/or ammonium salts, for the selective catalytic reduction of nitrogen oxides using ammonia in exhaust gases of vehicles. The inventive guanidinium formiate solutions enable a reduction of the nitrogen oxides by approximately 90%. Furthermore, said guanidinium formiate solutions can enable an increase in the ammonia forming potential from 0.2 kg, corresponding to prior art, up to 0.4 kg ammonia per liter of guanidinium formiate, along with freezing resistance (freezing point below −25° C.). The risk of corrosion of the inventive guanidinium formiate solutions is also significantly reduced compared to that of solutions containing ammonium formiate.

15 Claims, 1 Drawing Sheet

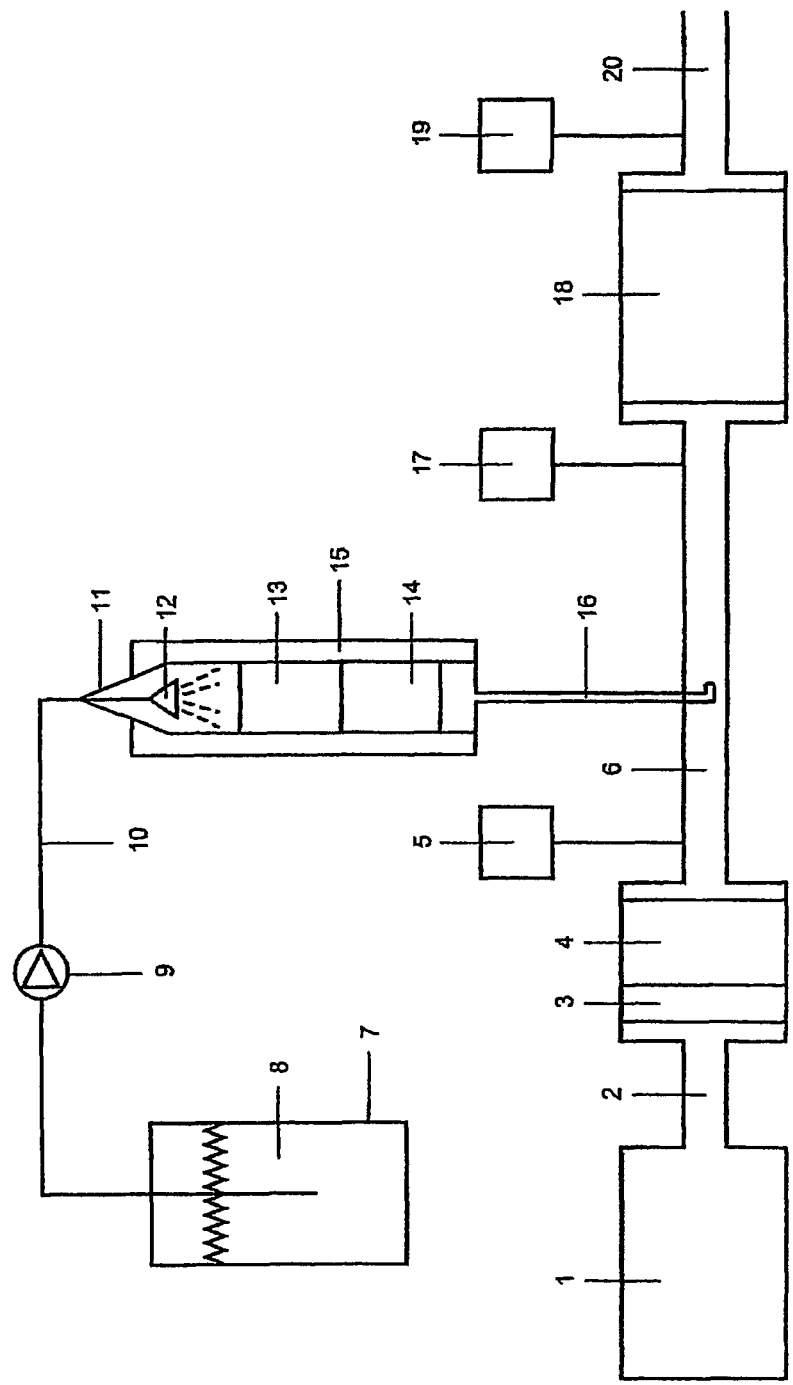

USE OF AQUEOUS GUANIDINIUM FORMATE SOLUTIONS FOR THE SELECTIVE CATALYTIC REDUCTION OF NITROGEN OXIDES IN EXHAUST GASES OF VEHICLES

RELATED APPLICATIONS

This application is a §371 application from PCT/EP2007/011284 filed Dec. 20, 2007 which claims priority from German Application Serial No. 10 2006 061 377.5 filed Dec. 23, 2006, each of which is herein incorporated by reference in its entirety.

The present invention relates to the use of aqueous guanidinium formate solutions for selective catalytic reduction of nitrogen oxides in exhaust gases of motor vehicles, wherein the guanidinium formate solutions in question produce ammonia by evaporation and catalytic decomposition, and this ammonia serves as a reducing agent for the subsequent selective catalytic reduction of the nitrogen oxides.

According to the prior art, ammonia ($NH_3$) serves as a reducing agent in the selective catalytic reduction of nitrogen oxides in exhaust gases of motor vehicles, and is introduced upstream of a specific SCR catalyst, or upstream of a group of SCR catalyst modules which can be flowed through in parallel and are integrated in a muffler, into the exhaust gas line of combustion systems and internal combustion engines, especially that of internal combustion engines of motor vehicles, and brings about the reduction of the nitrogen oxides present in the exhaust gas in the SCR catalysts. SCR means Selective Catalytic Reduction of nitrogen oxides ($NO_x$) in the presence of oxygen.

For the production of ammonia, especially in vehicles, various liquid and solid ammonia precursor substances have become known to date, and are described in detail hereinafter.

In utility vehicles, the use of an aqueous eutectic solution of urea in water (AdBlue™) with a content of 32.5% by weight of urea, a freezing point of −11° C. and an ammonia-formation potential of 0.2 kg/kg has become established as an ammonia precursor substance. For operation of the SCR system at temperatures down to −30° C., i.e. down to the cold flow plugging point (CFPP, lower operating temperature) of the diesel fuel in winter quality, comparatively complex additional heating, which is prone to operational faults, of the tank, lines and valves is required for AdBlue use and for AdBlue logistics in cold climates in winter.

The ammonia required for the catalytic reduction of the $NO_x$ is formed in the thermal decomposition of the urea. For this purpose, the following reactions are relevant: urea cannot be evaporated but falls apart when heated primarily to give isocyanic acid (HNCO) and ammonia ($NH_3$) according to equation [1].

$(H_2N_2)CO \rightarrow HNCO + NH_3$      [1]

The isocyanic acid can polymerize readily to nonvolatile substances such as cyanuric acid. This can give rise to operationally disruptive deposits on valves, on injection nozzles and in the exhaust gas pipe.

The isocyanic acid (HNCO) is hydrolyzed in the presence of water ($H_2O$) to ammonia ($NH_3$) and carbon dioxide ($CO_2$) according to equation [2].

$HNCO + H_2O \rightarrow NH_2 + CO_2$      [2].

The reaction [2] proceeds very slowly in the gas phase. In contrast, it proceeds very rapidly over metal oxide and/or zeolite catalysts, and somewhat more slowly of the metal oxide catalysts which are strongly acidic as a result of their $WO_3$ content, such as the SCR catalysts based on a mixed oxide of vanadium oxide, tungsten oxide and titanium oxide.

In the known applications of urea-SCR catalyst systems connected to motor vehicles, the engine exhaust gas is generally utilized with exploitation of the heat content thereof for thermal decomposition of the urea according to reaction [1]. In principle, the reaction [1] may proceed as early as upstream of the SCR catalyst, while reaction [2] has to be accelerated catalytically. In principle, reactions [1] and [2] can also proceed over the SCR catalyst, whose SCR activity is reduced as a result.

For countries in a cold climate, it is advantageous to be able to use a freezeproof ammonia precursor substance. Addition of ammonium formate to the solution of urea in water allows the freezing point to be lowered significantly. This makes additional heating superfluous and achieves considerable savings in the production and logistics costs. A solution of 26.2% ammonium formate and 20.1% urea in water possesses a freezing point of −30° C. and is commercially available under the name Denoxium 30 and can advantageously replace AdBlue™ in the cold seasons (SAE technical papers 2005-01-1856).

The addition of ammonium formate to the solution of urea in water allows, in the case of a solution of 35% ammonium formate and 30% urea in water, the ammonia formation potential to be increased from 0.2 kg/kg to 0.3 kg/kg. This increases the range of the vehicle by half with one filling of the ammonia precursor substance, and generally provides the possibility of long-term filling between the inspection intervals in passenger vehicles. One disadvantage of this measure is the rise in the freezing point of the solution to the range from −11 to −15° C. (Denoxium January 2005, www.kemira.com).

EP 487 886 A1 proposes a process for the quantitative decomposition of an aqueous solution of urea in water by hydrolysis to ammonia ($NH_3$) and carbon dioxide ($CO_2$) in a temperature range from 160 to 550° C., in which the result is the prevention of formation of undesired isocyanic acid and of solid conversion products thereof. In this known method, the urea solution is first sprayed by means of a nozzle on to an evaporator/catalyst present within or outside the exhaust gas. For aftertreatment, the gaseous products formed are passed over a hydrolysis catalyst in order to achieve quantitative formation of ammonia.

EP 555 746 A1 discloses a method wherein the evaporator, owing to its configuration, distributes the urea solution homogeneously such that contact of the droplets with the channel walls of the decomposition catalyst is ensured. A homogeneous distribution prevents deposits on the catalysts and reduces the slippage of excess reducing agent. The urea metering should be activated only at exhaust gas temperatures from 160° C., since undesired deposits are formed when the temperature is lower.

The conversion of ammonium formate as an ammonia precursor substance to ammonia is possible by injection of the aqueous solution into the hot exhaust gas through simple sublimation without any special pretreatment. A disadvantage is a simultaneous release of the very corrosive formic acid and the possible reformation of ammonium formate on the surface of the SCR catalyst at exhaust gas temperatures below 250° C. The pore system of the SCR catalyst is blocked in a thermally reversible manner.

It was therefore an object of the present invention to provide suitable ammonia precursor substances which do not have the cited disadvantages according to the prior art, but which enable technically simple production of ammonia for the reduction of $NO_x$ levels by the SCR process, and do not form any undesired by-products in the decomposition.

This object is achieved in accordance with the invention by using aqueous guanidinium formate solutions for selective catalytic reduction of nitrogen oxides with ammonia in exhaust gases of motor vehicles. Preferably in accordance with the invention, the aqueous guanidinium formate solutions are used, optionally in combination with urea and/or ammonia and/or ammonium salts.

This is because it has been found that, surprisingly, the guanidinium formate used in accordance with the invention has a higher ammonia formation potential compared to the prior art. Furthermore, the corresponding aqueous guanidinium formate solutions can be evaporated in a technically simple manner and without formation of solid decomposition products which might possibly lead to encrustation and blockage in the exhaust gas system.

For selective catalytic reduction of nitrogen oxides with ammonia in oxygen-containing or oxygen-free exhaust gases of motor vehicles, according to the invention, aqueous guanidinium formate solutions are used, which preferably have a solids content (guanidinium formate content) of 5 to 85% by weight, especially 30 to 80% by weight and preferably 55 to 60% by weight and are optionally combined with urea and/or ammonia and/or ammonium salts. The mixing ratios of guanidinium formate with urea and ammonia or ammonium salts may vary within wide limits, though it has been found to be particularly advantageous that the mixture of guanidinium formate and urea possesses a guanidinium formate content of 5 to 60% by weight and a urea content of 5 to 35% by weight, especially 10 to 30% by weight. In addition, mixtures of guanidinium formate and ammonia or ammonium salts with a content of guanidinium formate of 5 to 60% by weight and of ammonia or ammonium salt of 5 to 40% by weight, especially 10 to 35% by weight, are considered to be preferred.

The aqueous solutions used in accordance with the invention have especially a water content of ≥5% by weight, preferably ≥10% by weight, based on the total weight of the solutions. Water is preferably the sole or at least the main solvent with a proportion of ≥50% by weight, preferably ≥80% by weight and even more preferably ≥90% by weight, based on the total weight of solvents in the solution.

Useful ammonium salts in this context have been found, in particular, to be compounds of the general formula (I)

$$R\text{—}NH_3^{\oplus}X^{\ominus} \qquad (I)$$

where

R=H, $NH_2$, $C_1$-$C_{12}$-alkyl, $X^-$=acetate, carbonate, cyanate, formate, hydroxide, methoxide and oxalate.

It is considered to be essential to the invention that the aqueous guanidinium formate solutions and, if appropriate, the further components are subjected to a catalytic decomposition to ammonia in the preferred temperature range from 150 to 350° C., the further components formed being carbon dioxide and optionally carbon monoxide. This decomposition of guanidinium formate to ammonia is undertaken here in the presence of catalytically active, oxidation-inactive coatings of oxides, selected from the group of titanium dioxide, aluminum oxide and silicon dioxide and mixtures thereof, or/and hydrothermally stable zeolites which have been fully or partly metal-exchanged, especially iron zeolites of the ZSM 5 or BEA type. Useful metals here are especially the transition group elements and preferably iron or copper. The corresponding Fe zeolite material is prepared by known methods, for example, the solid-state exchange method, for example with $FeCl_2$, then applied in the form of a slurry to the substrate (for example cordierite monolith) and dried or calcined at higher temperatures (approx. 500° C.).

The metal oxides such as titanium oxide, aluminum oxide and silicon dioxide are preferably applied to metallic carrier materials, for example heat conductor alloys (especially chromium-aluminum steels).

The guanidinium formate solutions or the remaining components can alternatively also be catalytically decomposed to ammonia and carbon dioxide, in which case catalytically active coatings of oxides are used, selected from the group of titanium dioxide, aluminum oxide and silicon dioxide and mixtures thereof, or/and hydrothermally stable zeolites which have been fully or partly metal-exchanged, the coatings having been impregnated with gold and/or palladium as oxidation-active components. The corresponding catalysts comprising palladium and/or gold as active components preferably have a noble metal content of 0.001 to 2% by weight, especially 0.01 to 1% by weight. With the aid of such oxidation catalysts, it is possible to prevent the undesired formation of carbon monoxide as a by-product in the decomposition of the guanidine salts as early as in the course of ammonia production.

Preferably, for the catalytic decomposition of the guanidinium formate and if appropriate of the further components, a catalytic coating comprising palladium or/and gold as active components with a noble metal content of 0.001 to 2% by weight, especially 0.01 to 1% by weight, is used.

It is possible in the context of the present invention that a catalyst consisting of two sections is used, in which case the first section comprises oxidation-inactive coatings and the second section oxidation-active coatings. Preferably, 5 to 90% by volume of this catalyst consists of oxidation-inactive coatings and 10 to 95% by volume of oxidation-active coatings. Alternatively, the catalytic decomposition can also be performed in the presence of two catalysts arranged in series, in which case the first catalyst comprises oxidation-inactive coatings and the second catalyst oxidation-active coatings.

The catalytic decomposition of the guanidinium formate used in accordance with the invention and if appropriate the further components to ammonia can preferably be undertaken within the exhaust gas in a main stream, partial stream or secondary stream of the motor vehicle exhaust gases, or outside the exhaust gas in an autobaric and extraneously heated arrangement.

The present invention further provides aqueous compositions consisting of guanidinium formate with a concentration of 5 to 85% by weight, preferably 30 to 80% by weight, optionally in combination with urea and/or ammonia or ammonium salts, and water as the remainder, as a means of selective catalytic reduction of nitrogen oxides with ammonia in exhaust gases of motor vehicles. The mixtures of guanidinium formate and urea preferably have a guanidinium formate content of 5 to 60% by weight and a urea content of 5 to 35% by weight. The mixtures of guanidinium formate with ammonia or ammonium salts preferably possess a content of guanidinium formate of 5 to 60% by weight and of ammonia or ammonium salts of 5 to 40% by weight.

With the aid of the aqueous guanidinium formate solutions proposed in accordance with the invention, it is possible to achieve a reduction in the level of the nitrogen oxides in exhaust gases of vehicles by approx. 90%. Moreover, with the guanidinium formate solutions proposed in accordance with the invention, an increase in the ammonia formation potential of 0.2 kg according to the prior art up to 0.4 kg of ammonia per liter of guanidinium salt with simultaneous winter stability (freezing point below −25° C.) is possible. Finally, the risk of corrosion of the guanidinium formate solutions used in accordance with the invention is also reduced significantly compared to solutions comprising ammonium formate.

The examples which follow are intended to illustrate the invention in detail.

EXAMPLES

Example 1

Use of an Aqueous 40% by Weight Guanidinium Formate Solution (GF) (m.p.<−20° C.) as an Ammonia Precursor Substance in an Autobaric Ammonia Generator According to the Description of FIG. 1

An automobile engine 1 produces an exhaust gas stream of 200 m$^3$ (STP)/h, which is passed through the intermediate pipe 2 over a platinum oxidation catalyst 3 and a particulate filter 4 into the exhaust gas intermediate pipe 6. The exhaust gas composition measured with the FTIR gas analyzer 5 in the intermediate tube 6 is: 150 ppm of nitrogen oxide, NO; 150 ppm of nitrogen dioxide, NO$_2$; 7% carbon dioxide, CO$_2$; 8% water vapor, 10 ppm of carbon monoxide, CO.

In a tank vessel 7, there is a GF solution 8 which is sprayed by means of a metering pump 9 through a feed line 10 and a nozzle 12 into a reactor 11. The reactor 11 consists of a vertical tube heated to 250° C., which has internal diameter 51 mm, is made of austenitic steel and possesses a heating jacket 15. The catalysts 13 and 14 are present in the reactor 11. The catalysts are metal carriers (diameter 50 mm, length 200 mm, manufacturer of the metal carriers: Emitec GmbH, D-53797 Lohmar) coated with titanium dioxide from Südchemie AG, Heufeld, Germany. The catalyst 13 is based on a coarse-cell MX/PE 40 cpsi carrier type, length 100 mm. In the downstream direction, the catalyst 14 consists of the fine-cell MX/PE 200 cpsi carrier type, length 100 mm. The end face of the coarse cell catalyst 13 is sprayed with a GF solution 8 by means of a pressure metering pump 9 from a nozzle 12. The nozzle 12 is arranged axially in the reactor 11 and upstream of the coarse-cell catalyst 13. The water content of the GF solution 8 is evaporated over the catalyst 13 and the GF is decomposed thermo-hydrolytically over catalysts 13 and 14 such that the formation of the urea and isocyanic acid, HNCO, intermediates is prevented.

The mixture of ammonia, carbon dioxide, carbon monoxide and water vapor formed is introduced via the feed pipe 16 into the exhaust gas intermediate pipe 6 upstream of an SCR catalyst 18 at 300° C. into the exhaust gas (200 m$^3$ (STP)/h) of the automobile engine 1 which has been pretreated with the catalyst 3 and the filter 4. The dosage of the GF solution 8 is regulated with the pressure metering pump 9 such that an ammonia concentration of 270 ppm can be measured with the FTIR gas analyzer 17. At the same time, there is a rise in the CO concentration by 90 to 100 ppm as a result of the decomposition of the formate content of the GF solution 8. As expected, the rise in the CO$_2$ content and water vapor content as a result of the evaporation and decomposition of the GF solution 8 is low and almost impossible to measure. The catalytic hydrolysis of the GF is complete, since no isocyanic acid, HNCO, can be detected with the gas analyzer 17 and no deposits of urea and the decomposition products thereof can be detected.

Downstream of the SCR catalyst 18, the FTIR gas analyzer 19 measures a reduction in the concentration of NO and NO$_2$ by 90% to 30 ppm. At the same time, there is complete reaction of the ammonia, NH$_3$, with NO and NO$_2$ to give nitrogen, N$_2$. The concentration of the ammonia downstream of the SCR catalyst 19 is <2 ppm.

The FTIR gas analyzers 5, 17 and 19 enable a simultaneous exhaust gas analysis of the components NO, NO$_2$, CO, CO$_2$, H$_2$O, ammonia, NH$_3$, and isocyanic acid, HNCO.

Example 2

The procedure is analogous to Example 1, except that the titanium dioxide catalyst 14 is replaced by a palladium oxide-titanium dioxide catalyst, the titanium dioxide having been impregnated with an aqueous Pd(NO$_3$)$_2$ solution so as to form, after the drying and calcination (5 hours at 500° C.), a catalyst which contains 1% by weight of PdO (=approx. 0.9% by weight of Pd) and bring about a partial oxidation of the carbon monoxide. No rise in the CO concentration is measurable at the FTIR gas analyzer 17.

The invention claimed is:

1. A method for selective catalytic reduction of nitrogen oxide in exhaust gas of a motor vehicle, comprising
   contacting said exhaust gas to a solution of aqueous guanidinium formate under conditions favoring formation of ammonia from said aqueous guanidinium formate without formation of solid decomposition products, said ammonia acting to reduce said nitrogen oxide.

2. The method of claim 1, wherein said solution further comprises urea, ammonia, or at least one ammonium salt.

3. The method of claim 1, wherein said aqueous guanidinium formate solution contains from 5% to 85% by weight of solids.

4. The method of claim 1, wherein said aqueous guanidinium formate solution contains from 30% to 80% by weight of solids.

5. The method of claim 2, wherein said solution contains from 5% to 60% by weight guanidinium formate, and from 5% to 35% by weight urea.

6. The method of claim 2, wherein said solution contains from 5% to 60% by weight guanidinium formate, and from 5% to 40% by weight ammonia or ammonium salt.

7. The method of claim 2, wherein said ammonium salt has formula:

$$R-NH_3^{\oplus} X^{\ominus}$$

wherein R is H, —NH$_2$, or C$_1$-C$_{12}$ alkyl, and X is acetate, carbonate, cyanate, formate, hydroxide, methoxide or oxalate.

8. The method of claim 1, comprising producing ammonia from guanidinium formate by catalytic decomposition of guanidinium formate within a main stream of said exhaust gas, a partial stream of said exhaust gas, a secondary stream of said exhaust gas, or outside of said exhaust gas, in an autobiotic and extraneously heated system.

9. The method of claim 1, comprising catalytically decomposing said guanidine formate to ammonia and carbon dioxide via a catalytically active, oxidation inactive coating of an oxide selected from the group consisting of titanium dioxide, aluminum oxide, silicon dioxide or a mixture thereof and a hydrothermally stable zeolite.

10. The method of claim 9, wherein said hydrothermally stable zeolite has been at least partially metal exchanged.

11. The method of claim 9, wherein said coating has been impregnated with gold or palladium.

12. The method of claim 11, wherein said gold or palladium is present in said coating in an amount ranging from 0.001% to 2% by weight.

13. The method of claim 8, further comprising using a catalyst consisting of two sections, said first section comprising an oxidation inactive coating, and the second section an oxidation active coating.

14. The method of claim 13, wherein from 5% to 90% of volume of said catalyst consists of said oxidative inactive coating, and from 10% to 95% of volume of said catalyst consists of said oxidative active coating.

15. The method of claim 1, comprising catalytically reducing said guanidinium formate at a temperature of from 150° C. to 300° C.

* * * * *